US005579117A

United States Patent [19]

Arsenault et al.

[11] Patent Number: 5,579,117

[45] Date of Patent: Nov. 26, 1996

[54] METHOD OF MANUFACTURE OF A TRADING CARD AND THE LIKE USING COMPUTER GENERATED DUPLEX TEMPLATE PRINTING METHOD

[76] Inventors: Emile Arsenault; Evan Leibovitch, both of 1440 Torrington Drive, Mississauga, Ontario, Canada, L5V 1W4

[21] Appl. No.: 301,634

[22] Filed: Sep. 7, 1994

[51] Int. Cl.[6] .......................... G03B 27/48; G03B 17/24; B32B 3/00; B42D 15/00

[52] U.S. Cl. .......................... 358/296; 355/20; 428/195; 283/117; 396/332

[58] Field of Search .......................... 358/296; 235/487; 355/20; 354/109; 428/195; 283/117

[56] References Cited

U.S. PATENT DOCUMENTS 5,180,906 1/1993 Yamada .................................. 235/487

*Primary Examiner*—Peter S. Wong
*Assistant Examiner*—Gregory J. Toatley, Jr.
*Attorney, Agent, or Firm*—Neil H. Hughes; Ivor M. Hughes; Marcelo K. Sarkis

[57] ABSTRACT

A method is described for making handleable card having images on front and back surface of the card. The process includes the creation of templates which incorporate a combination of design elements and repetitive textual information stored as computer files. These templates are combined with textual information specific to each card, as well as digital representations of scanned photographs; also stored as computer files. The resulting composite images are printed onto a single sheet material having front and back surface covered with plastic laminate film which has been treated with an adhesive layer on its inside surface. The covered sheet material is passed through laminator for fusing the front and back sheet material to the plastic laminate film and cut into separate card.

13 Claims, 4 Drawing Sheets

METHOD OF MANUFACTURE OF A TRADING CARD AND THE LIKE USING COMPUTER GENERATED DUPLEX TEMPLATE PRINTING METHOD

FIELD OF INVENTION

The present invention relates to cards and more particularly to a method of manufacturing souvenir cards displaying images of for example amateur ball players, hockey players, school graduates and the like.

BACKGROUND OF THE INVENTION

Photo or sports cards have been in existence for some time and the quality and the manufacturing processes are quite varied. The quality of the cards range from, using state of the art printing processes producing collectors cards of professional athletes to the rather crude method of sticking a peel off label onto a photograph. These two processes are far apart in quality.

The cards printed for professional athletes are manufactured and sold in high volumes and therefore much more investment can be undertaken to obtain a high degree of quality. The less expensive souvenir card is custom made in minimum quantities, such as runs of as few as five or twelve cards.

In the past couple of years some custom cards have been produced with the use of digital computer imaging. Even here the quality, while it is much improved over the peel off label cards, is still somewhat less than the professionally produced cards. These latter cards use a process of either printing the images through the use of laser printers or copiers, on laser paper or a thin card stock, and then gluing various thickness of paper together to produce a card of the acceptable thickness and firmness.

Examples of various manufacturing methods of cards and the like are disclosed in U.S. Pat. Nos. 5,282,651; 5,270,101; 5,229,190, 4,773,677; 4,259,391; 4,070,774 , and 4,086,379. These prior art patents generally teach a card where papers containing computer generated image are glued to each other. However, these prior art patents don't provide a simple mechanism for protecting the card from, becoming dog-eared from constant handling, the cracking of the toner on the image with handling of the cards, the smudging, smearing and tearing of the card. These prior art cards are made from "card stock" or multiple sheets of paper glued together to give it acceptable thickness and firmness and are subject to cracking when they are bent back upon themselves. Cracking will also occur when the card is handled over a period of time. The cracking is due to the fact that the toner, being situated on the outside layer of the thickened card, cannot stretch and therefore must crack, or separate in the direction of the bend.

It is therefore, a primary object of this invention to provide a method of manufacturing a card of high quality providing protection against smearing, smudging, tearing and cracking, the card. It is a further objects of this invention to provide a method of manufacturing a handleable card which is protected from being dog-eared through constant handling and use thereof, and the card thereof Further and other object of this invention will become apparent to those skilled in the art when considering the following summary of the invention and the more detailed description of the preferred embodiments illustrated herein.

SUMMARY OF THE INVENTION

According to one aspect of the invention there is provided a method of manufacturing cards (for example, sports related cards, graduation cards, and baby picture cards) having images on front and back surfaces of the cards, the method comprising preparing variable information consisting of graphics and text data on a computer file (for example, the Corel Draw™ program exemplified in the detailed description of the embodiment) having front and back card template files, preferably said card template files further comprising at least nine template copies prepared for each of said front and back templates (in one embodiment the front and back templates include a master template for controlling the design of the remaining template copies), placing said valuable information on the card template (preferably on the back of the template) scanning at least one photographic image into computer legible format and saving said image in a file, importing said image from said file into the front card template, printing the front and back card template images (for example, on a colour printer which is capable of depositing color toner particle on a paper) onto a single sheet of material having a front and back surface (in one embodiment the back template image is printed first with a maximum of 30% toner coverage and the front template image is printed last such that a thin layer toner coverage is obtained in order to prevent smearing and smudging of the front or back card), said front sheet containing the image of the front template and said back sheet containing the image of the back template wherein when printed the images are aligned and correspond to each other; covering the printed sheet of material with said images thereon with a substantially transparent plastic laminate film, said transparent plastic laminate film having been treated with a dry thermal adhesive layer on its inside surface (in one embodiment the laminate film has a thickness of 6 to 12 mil, preferably 10 mil), passing said covered sheet of material through a laminator, wherein said sheet is strengthened and cut into separate card portions, wherein when subjected to folding or bending the separate card portion will spring back to its original condition without significant adverse degradation.

In one embodiment said handleable card is further characterized in that the card ranges in dimensions from 2 to 5 inches on each side and 3 to 8 inches in length, the card comprising a single sheet of material having a front and back image bearing surfaces, a printed image of the front template (for example a baseball player) and back template having graphics (for example a baseball glove) and information corresponding to the front image (for example position of a player), a protective transparent plastic laminate film covering over the image bearing sheet of material front and back surfaces being bounded to said sheet of material by an adhesive layer. In another embodiment said card includes a margin varying in width from substantially one-twentieth of an inch to substantially one-half of an inch left devoid of toner particles during printing to ensure that the transparent plastic laminate film adheres strongly to the fiber of said sheet material and thereby reducing the effects of separating of the laminate film from the sheet material.

According to another aspect of the invention there is provided a method of manufacturing cards (for example, sports related/cards, graduation, real estate, photo ID, baby or other collector cards) having images and textual information displaying on both front and back surfaces. The method comprising the preparation of two computer composite images, one each for the fronts and backs of the intended cards. Each composite image contains information for multiple cards, depending on the size of the paper used to contain the composite images nominally the composite image for a regular letter size paper (8½"×11") would contain nine cards, larger papers could contain more. The text and images for each of the individual cards in a composite image is achieved through the use of specialized computerized tools.

For images such as photographs and company logos, graphical software such as Corel Photo Paint™, Corel Trace™ and Adobe PhotoShop™ are used to render these images into a form usable by these parts of this process used to combine text and graphics into the composite images to be printed.

Before combining into the composite image, the original individual images which nay be scanned into computer format or drawn free hand can be retouched or modified by the aforementioned software. The intent of such modification is to correct colour imperfections in scanners and printers as well as to smooth and simplify the images of logos and similar art work converted to computer form Textual data containing such information as a persons name or statistics, or item's specifications is usually supplied as the above has limited textual capabilities. The software generates typed textual information in a format usable in forming the composite image. Further, the software may be customized routinely to provide application specific fill in the blanks style, data verification and error checking, For instance, in the case of sports cards, the software would allow a player's position to be entered only in one specific manner regardless of how it is typed in.

An alternative version of this method allows text to be manually input into computer format using a text editor such as the Notebook program supplied in Microsoft windows or the Vi editor supplied with Unix™. The format of the textual computer data placement and sizing of the text and graphics to create multiple cards within the composite image, is determined by the Corel Draw™ program. Corel Draw™ is used to create a "template", which uses graphic elements called guidelines to predetermine the placement of all images and text. The template is also used to duplicate textual and original graphic elements which are repeated across multiple cards on the composite image.

Separate templates are created for the front and back of each planned composite image. Using the Corel Draw™ "Import" facility, graphic computer images such as logos and scanned photos are brought into the templates. Another facility of Corel Draw™ known as "Extract" is used to determine the file format used by the customized textual software described above. Yet another facility of Corel Draw™ known as "Merge Back" is used to incorporate the modified text file to reflect the data entry required for a particular composite image. Having incorporated the necessary graphical and textual elements, the composite image is generated either directly to a printer or onto a disk drive.

Both front and back composite images are generated in this manner and the positioning of the templates, at the time the templates are created, ensures proper front to back registration of the individual cards within the composite image to be printed. Finally the front and back composite images are printed on each side of a single sheet of suitable paper.

BRIEF DESCRIPTION OF THE DRAWINGS

The invention will now be illustrated with respect to the following drawings illustrating embodiments of the invention of which.

DETAILED DESCRIPTION OF PREFERRED EMBODIMENTS OF THE INVENTION

Figure 1A:
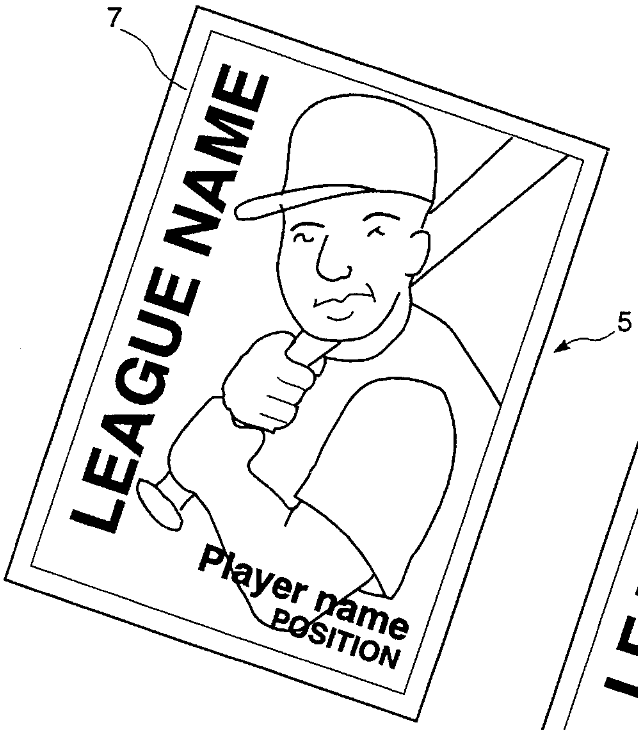
FIG. 1 is a perspective view of front and back of image bearing handleable cards in accordance with a preferred in embodiment of the invention.
Figure 1B:

Referring now to the drawings, the handleable card of the present invention is indicated generally at 5; and is shown in FIG. 1 comprising a front (7) and back (8) image bearing surfaces. The images of the front surface (7) and back surface (8) are first prepared on a computer file (not shown) using Corel Draw™ Software. Through Corel Draw™ a number of different style templates are prepared such that each style has two template files, one for the front and one for the back. The front template may be designed to be usage (sport) generic, for example baseball, hockey, basketball, soccer, football, baby pictures. The front template may or may not contain any reference to any specific activity. The back template, however is event and/or sport specific, for example the back template may include graphics and motifs which are sport specific, such as a baseball glove, a swinging batter and each sport or event can be identified with a specific graphic or motif. The front and back templates for example may consist of designs of 9 or 18 image templates which contain a control or master template, measuring 2.5"×3.5"in the first position. This control or master template is then cloned 8 times for a design of 9, or 17 times for a design of 18 images and the cloned items are placed in their respective positions. The templates are prepared in such a way that one may change the color arrangements of the text, the font size or type, the background, or any other element of the internal design of the card by simply making changes on the control or master template and these changes will be made for the entire template in question. The master or control template could be designed for each sport or event and saved for future use wherein a copy of this template is used for the actual production of the cards.

The next step is to input the text data to the front template. This is accomplished through an extract and merge-back method which is available on the application program mentioned earlier. Having prepared the front template, the file is saved in a computer printable form (a .PRN file format). The back template, which contains data pertinent to the card front is then prepared, the graphics and motifs are selected, the colors are assigned and the text data is input again using the extract and merge-back method. When this file is complete it is saved in a computer printable form. After the templates are prepared, photographic images are scanned using a scanner (not shown) into digital computer legible format. The photographs used can be either 3"×5.5", 4"×6", or 5"×7" in size. One entire set having 9 photographs may be scanned at once with the scanner through the "TWAIN" utility software provided with the scanner. After scanning the photographic images, color bit maps are color corrected, if necessary, again through Photo Shop. The bit maps are then saved.

Once the images have been scanned and modified they are imported into the front template and assigned a location (for example from A to I for a 9 card template and from A to R for an 18 card template). Preferably there is no photographic image to be imported onto the back of the card, however should the need arise, this would be done in the same manner as described above. Corel Draw contains an extract and merge-back function. With this function it is possible to extract all the TEXT information in a Corel Draw file and convert it to a TXT file format which is legible by a word processing program such as NotePad™. Once the extract has been done, the .TXT file is called up into the NotePad program, the TEXT information required to be changed is made, the modified file is then saved as an extension file (a .TXT file). The motifs mentioned above are preferably placed in the template in a layered array. This permits to selectively print or hide any or all of the motifs, for example some of the motifs may be shown in a faint silhouette form. Any combination of graphic or motif may be displayed.

Figure 2:
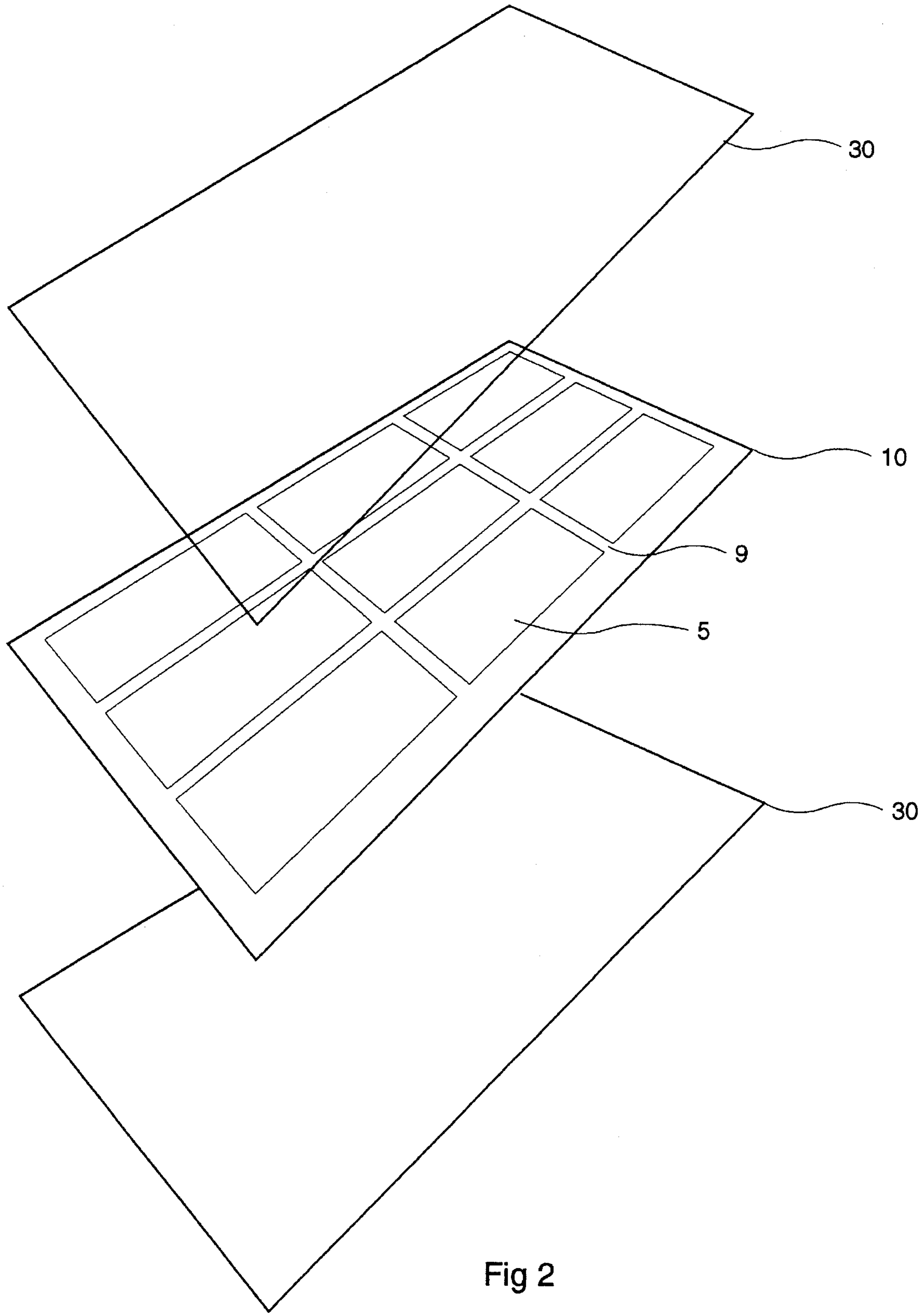
FIG. 2 is an exploded view of FIG. 1 showing the plastic laminate film prior to being adhered to the sheet material.
Figure 3:
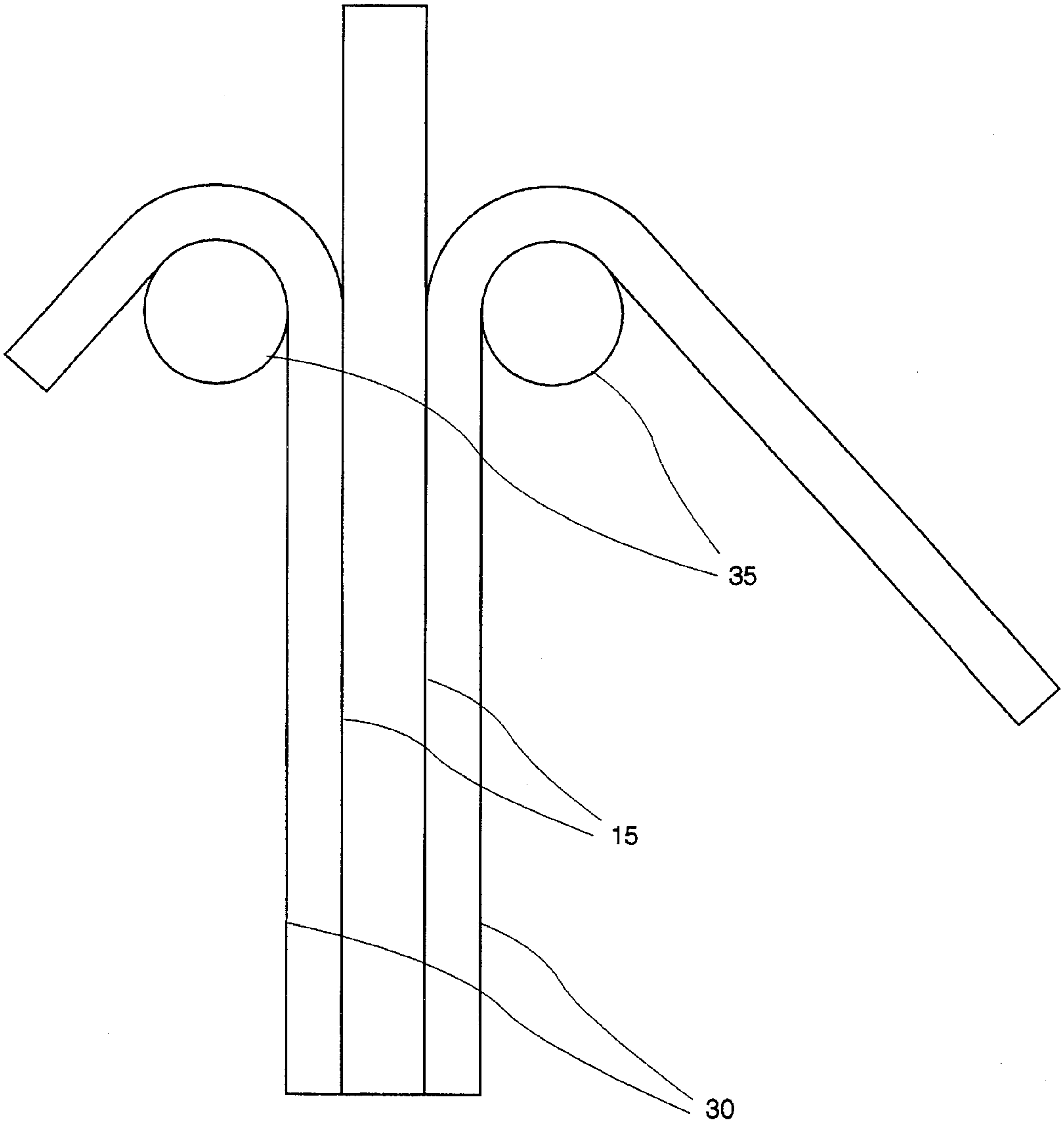
FIG. 3 is a sectional view showing the details of the lamination process, illustrated in a preferred embodiment of the unit.

When ready, the front and back template files are sent to the printer (not shown) to be printed front and back onto a single sheet of material (10) (preferably the sheet material is a thin flexible paper) shown in FIG. 2. The front and back template images are placed on the sheet material (10) by a color photocopier which deposits toner particle (15) onto said sheet of material. The sheet material (10) contains the entire set of images prepared in the template files, for example nine photographic images which correspond to the same number of cards. The images on the sheet material (10) are provided with a minimum of 0.25 inch of spacing (9) between individual images such that the spacing (9) will provide a margin of error that could be encountered during printing step and the cutting of the sheet material into individual cards. The back template image is preferably printed first such that the back surface of the sheet material (10) contains less toner coverage (preferably a maximum of 30 %) than the front surface of said sheet of material which is printed on the second pass through the photocopier when the sheet of material is reversed and reinserted into the photocopier.

The next step in the production process is to cover each sheet of printed material (10) with a plastic laminate film (30) and passing through a laminator (not shown) wherein a plurality of heated roller (35) fuses the front and back sheet material (10) to the plastic laminate film (30) in order to ensure sufficient bonding between them such that when the sheet material (10) is cut into separate card (5) and subjected to folding or bending, the card (5) will spring back to its original condition without significant adverse effect. The process can use either hot or cold laminate, however the adhesive on the laminate film should have high adhering capabilities. The cold laminate does not need any application of heat to melt the adhesive, simply a strong and steady application of pressure which is supplied by rollers (35) is sufficient. The hot laminate requires that the laminate film be heated prior to its use in order to melt the adhesive and a strong and steady pressure from rollers (35) is also required. Either hot or cold laminate will suffice, however it is recommended that the hot laminate be employed since it is more cost effective. A variety of different thickness laminate film was tested. The 3 and 5 mil laminate film did not provide enough thickness and firmness for the photo (sport) cards, however it would be ideal for 8×10 photographs and bookmarks. A 10 mil plastic laminate film is found to be ideal for the photo card of the present invention which provided a proper feel and look to the card.

Figure 4:
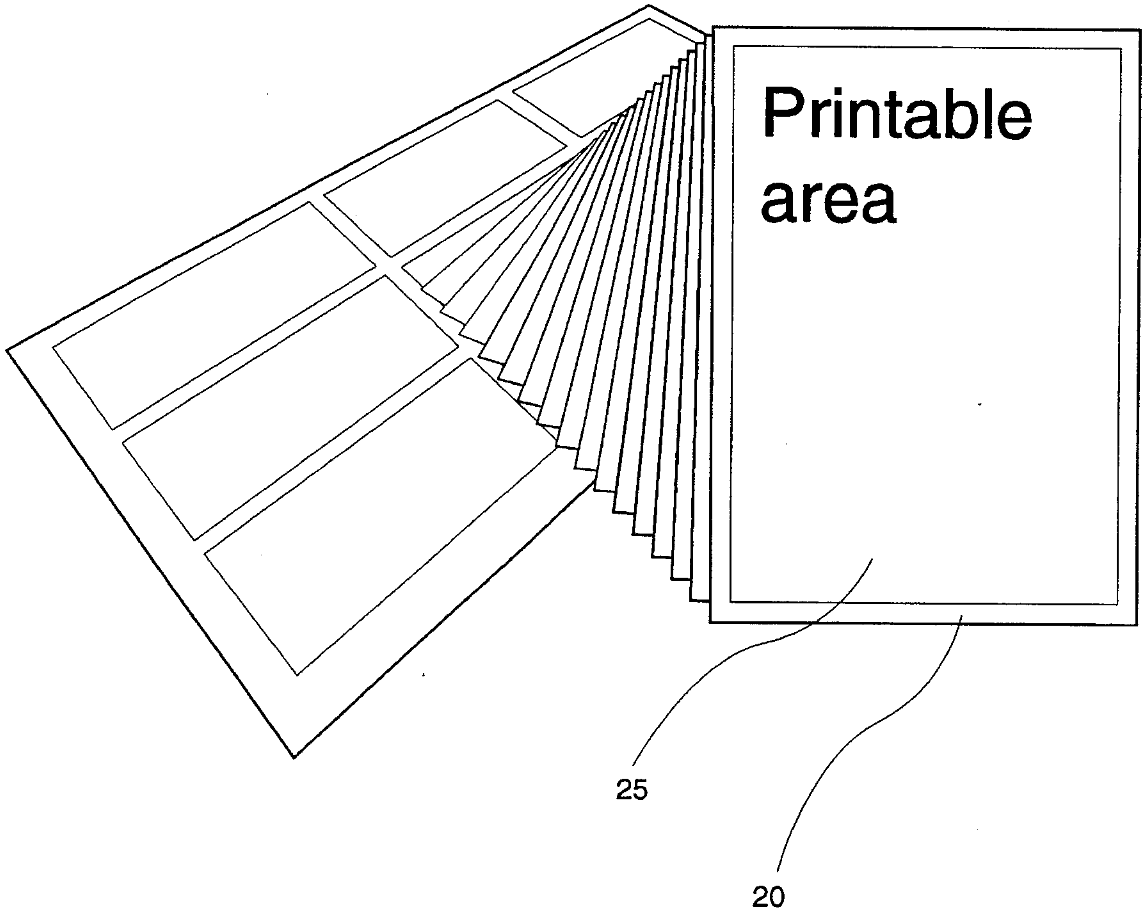
FIG. 4 is a front view of one of the card cut from the sheet material, illustrates in a preferred embodiment of the unit.

The front and back templates of the present invention are designed so that each individual card (5) is 2.5"×3.5" in size. It is to be noted that this is the standard size for the professional sports cards on the market. The printed area (25) of the image on each card is preferably 2.25"×3.25" and is centered on the card (5) as shown in FIG. 4. This leaves a one-eight of an inch of margin (20) around the front and back of the card (5) devoid of toner particle (15). This is important for two reasons: first, the card is more aesthetically pleasing with a margin (20) around it; second, since the margin (20) is devoid of toner particle (15), the plastic laminate film (30) covering the sheet material (10) adheres quite strongly to the unprinted surface (non toner containing border) thereby enabling the card (5) to withstand cracking at the tip and staining of the image on exposure to water and the like. Thus, the cumulative bond between all three components of the card (5): the sheet material (10), the toner particle (15), and the plastic laminate film (30) are sufficient to provide a quality and flexible card. It also has the advantage of providing protection against smearing, smudging of the card, preventing tearing and cracking, and as the front and the back of the card (5) is covered with plastic it could be washed with a damp cloth without damaging it. Finally, it also protects the card from becoming dog-eared with handling.

As will be apparent to those skilled in the art, various modifications and adaptations of the invention described above may be made without departing from the scope or sprit of the invention; the limitation of the scope of the embodiment of the invention are to be construed in accordance with the accompanying claims and not in a limiting sense.

The embodiments of the invention in which an exclusive property or privilege is claimed are as follows:

1. A method of manufacturing handleable card having images on front and back surface of said card, the method comprising the steps of:

preparing variable information on a computer file having front and back template files, and placing variable information on the said template;

scanning at least one photographic images into computer legible format, saving said images in a file;

importing said photographic images from said files into the front template and placing;

printing the front and back template images onto a single sheet material having a front and back surface, such that the front of said sheet material contains the image of the front template and the back of said sheet material contains the image of the back template image;

covering the front and back surface of said sheet material with the images thereon with a substantially transparent plastic laminate film and (passing) said sheet material with the laminate cover thereon through laminator, wherein said sheet material is strengthened and when cut into separate card portions and subjected to folding or bending will spring back to its substantially original condition without significant adverse effect.

2. The method of claim 1 wherein said front and back templates further comprises at least nine template copies prepared for each of said front and back templates such that the front and back templates may consist at least a total of 18 template copies.

3. The method of claim 2 wherein said front and back templates include a master template for controlling the design of the remaining template copies such that a design change in the said master template produces change in the remaining template copies.

4. The method of claim 1 wherein said printing is performed on a colour photocopier capable of depositing colour toner particle on the front and back surface of said sheet material.

5. The method of claim 4 wherein said back template image is printed first on the said sheet material with a maximum of 30% toner particle coverage.

6. The method of claim 5 wherein said front template image is printed on the said sheet material on a second pass through the photocopier when the said sheet material is reversed and reinserted into the photocopier.

7. The method of claim 1 wherein said plastic laminate film further comprises a dry thermal adhesive layer on the inside surface.

8. The method of claim 1 wherein said laminate film further comprises a thickness of 6 to 12 mil.

9. The method of claim 1 wherein said laminate film further comprises a thickness of 10 mil.

10. The method of claim 1 wherein said handleable card further comprises a margin varying in width from substantially one-twentieth of an inch to substantially one-half of an inch left devoid of toner particles during printing such that the said plastic laminate film adheres strongly to the fiber of said sheet material and thereby reduces the possibility of separating the laminate film from the sheet material.

11. The method of claim 1 wherein said handleable card further comprises a margin of one-eight of an inch around the front and back surface of the card devoid of toner particles.

12. A handleable card made according to the method of claim 1 the card comprising:

(a) a single sheet material having a front and back surface having an image printed thereon, each of said front and back surface having a margin of one-eighth of an inch devoid of printed image around the said front and back surface;

(b) a protective transparent plastic laminate film covering said front and back surface sheet material with the image thereon, said laminated film having a dry thermal adhesive layer on the inside surface of the laminate film for bonding said laminate film to the said front and back surface of sheet material.

13. The handleable card of claim 12 wherein the back surface contains a maximum of 30% toners particle coverage.

* * * * *